United States Patent Office 3,210,423
Patented Oct. 5, 1965

3,210,423
N,N'-DI(TETRA-SUBSTITUTED-PHENYL)-
DIAMINOMETHANES
Alfred Margot, Basel, Switzerland, assignor to J. R. Geigy
A.-G., Basel, Switzerland
No Drawing. Filed May 23, 1963, Ser. No. 282,555
Claims priority, application Switzerland, June 6, 1962,
6,836/62
3 Claims. (Cl. 260—570.5)

The present invention relates to new methylene anilines with excellent nematocidal properties, to the preparation thereof and to nematocidally active compositions for controlling plant-parasitic nematodes, which compositions contain the new methylene anilines as active ingredients.

Up to the present, only those active substances have attained great importance in controlling plant parasitic nematodes living in the soil, which either act in the gaseous phase such as, e.g., 1,2-dibromo-3-chloropropene and mixtures of dichloropropane and dichloropropene, or which are quickly decomposed in the soil such as, e.g., the sodium salt of monomethyl dithiocarbamic acid or 3,5-dimethyl-tetrahydro-1,3,5-thiadiazine-2-thione.

The group of active substances first mentioned has the disadvantage that they have to be injected into the soil and, therefore, their use is complicated and expensive. The second group of active substances mentioned is unstable not only after application but also on previous storing and some of them can only be stored in the form of their aqueous solutions at concentrations which exclude their application as scattering agents. In addition it is highly impracticable to use such agents, for example in greenhouses or in the neighbourhood of human dwellings, because of their irritant action and their bad smell.

It is, therefore, an object of the present invention to provide nematocidally active substances and compositions containing the same which can be safely stored for prolonged periods in concentrated form, and which permit application to the soil by all conventional methods including particularly the use as scattering agent.

It has been found that methylene anilines of the formula

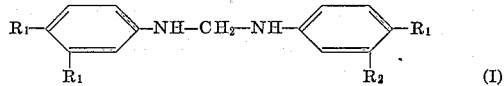

in which each of $R_1$ and $R_2$, independently, represents a lower alkyl radical, a halogenated lower alkyl radical, an alkenyl radical with from 3 to 4 carbon atoms, or a halogen atom, are surprisingly highly suitable as active substances for controlling plant parasitic nematodes and thus fulfill the above-stated and other related objects. The compounds of general Formula I have the important advantage of being inodorous, crystalline solids which are only slightly volatile and non-toxic to plants and warm-blooded animals.

"Lower" as used in this specification and the appended claims in connection with alkyl and halogenated alkyl radicals means those having 1 to 4 carbon atoms. Fluorine, chlorine or bromine are to be understood by "halogen" atoms. Particularly interesting are the compounds of general Formula I in which $R_1$ and $R_2$ are chlorine or $R_1$ is methyl and $R_2$ is chlorine.

The new compounds are produced by reacting 2 mols of an aniline of general Formula II

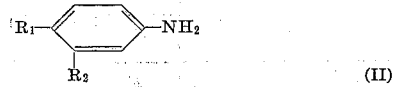

wherein $R_1$ and $R_2$ have the meanings given above, with one mol of a compound which is capable of forming a methylene bridging member. The reaction is performed in the presence of a base such as tertiary lower alkyl amines, alkali and earth alkali metal hydroxides or alkali metal carbonates, without a solvent, in an excess of the aniline when liquid, or, preferably in an inert organic solvent such as ethyl alcohol.

Compounds capable of forming a methylene bridging member are formaldehyde and compounds which react like formaldehyde, particularly paraformaldehyde, hexamethylenetetramine and bis-chloromethyl ether.

The new compounds can be used as the active agent for combating nematodes either alone or in mixture with agricultural carriers in solid form, for instance, as finely powdered scattering agent or as granulates, or they can be used in liquid form as an emulsion, suspension or solution. In compositions, the content of the active ingredient may vary widely, from about 2 to 90% by weight. The choice of the form in which the neumatocidal compounds according to the invention and the compositions containing the same are used depends on the intended method of application which, in its turn, depends on the type of nematodes to be controlled, the plants to be protected, the climate and soil conditions as well as on the agricultural apparatus available. An even distribution of the active ingredient over the area to be controlled throughout a layer of soil about 15 to 25 cm. deep is generally advantageous, the amount of active substance thus necessary being, in general, about 20 to 600 and, preferably, 50 to 250 kg./hectare (corresponding to 10 to 300 milligrams of active substance per liter of soil in 20 cm. depth). On the other hand, a discontinuous, more localized application is possible, for example, one limited to dibble holes or seed furrows, whereby a sufficient protective action can often be attained with a lesser amount of active substance.

Nematocidally active dusts according to the invention can be produced on the one hand by mixing or grinding together the active substances with a solid, pulverulent water insoluble or sparingly soluble carrier substance, which does not react with the compounds of Formula I. As such can be used, for example, talcum, diatomaceous earth (kieselguhr), kaolines, bentonite, calcium carbonate, boric acid or tricalcium phosphate. On the other hand, the active substances may also be mounted on the carrier substances by means of a volatile solvent. To produce scattering agents and granulated compositions, either coarse-grained and/or carrier substances of greater density may be used such as, fairly coarsely ground limestone, sand or loess or mixtures of active substance with finer-grained possibly porous carrier substances may be granulated.

In addition, scattering agents may also contain as carriers substances in coarsely grained form or solid substances of greater solubility in water or ammonium citrate, for example, synthetic fertilisers such as solubilised calcium phosphates or other calcium, potassium or ammonium salts, in particular phosphates or nitrates. Emulsions may be applied both to unplanted land or, owing to their power of penetration, in existing plant cultivations. For their preparation the active substances, after dissolving in agricultural organic solvents, non-reactive with said substances, such as xylene, may be emulsified in water which contains a surface active substance. In the use of emulsions, it is usually advantageous in practice first to prepare concentrates by combination of active substance with inert organic solvents and/or surface active substances (emulsifying agents, which, in their turn, are mono- or poly-phase systems, and can be worked up with water to form ready-for-use emulsions. As surface active substances such as quaternary ammonium salts, anion active substances such as salts of aliphatic, long-chain sulfuric acid monoesters, long-chain alkoxyacetic acids and aliphatic-aromatic sulfonic acids, and nonionogenic substances, e.g. polyethylene glycol ethers of fatty alcohols or of dialkyl phenols and polycondensation products of ethylene oxide, as well as amphoteric substances can be employed. Suitable solvents for the production of emulsion concentrates are, e.g. monocyclic aromatic hydrocarbons such as benzene, toluene, xylene; ketones; alcohols and other solvents such as ethyl acetate, dioxan, acetone glycerin or diacetone alcohol.

Suspensions can be obtained by suspending moist active substances in water which optionally contains a surface active substance, or by suspending wettable powders, which, in their turn, are prepared by mixing solid active substances with solid pulverulent carriers and surface active substances, in water.

As solvents for the active substances according to the invention, in particular halogenated aliphatic hydrocarbons having themselves a nematocidal action are employed, for example 1,2-dibromo-3-chloropropene, di-chlorobutene, or mixtures of di-chloropropane and di-chloropropene, the instantaneous nematocidal action of which is broadened in a valuable way by that of the active substances according to the invention.

In the amounts employed in practice, the compounds according to the invention have no phytotoxic action so that there is no injurious effect on plant growth. If desired, the bological activity of the agents according to the invention can be broadened by the addition of fungicidal, herbicidal or insecticidal or also nematocidal active substances.

The compounds and compositions according to the invention are particularly effective in the control of such nematodes as:

Meloidogyne species
*Panagrellus redivivus*
*Rhabditis longispina*
Pratylenchus species
Ditylenchus species In the following, two non-limitative examples are given which illustrate the process according to the invention, as well as a number of non-limitative examples which illustrate typical forms of application and finally one example illustrating the test method used for the determination of the nematocidal activity of compounds according to the invention. Parts and percentages are given by weight unless stated otherwise, and temperatures are in degrees centigrade.

*Example 1*

20 parts by volume of 37% aqueous formaldehyde solution are poured at about 50° into a solution of 65 parts of 3,4-dichloroaniline in 60 parts by volume of methanol and 100 parts by volume of cyclohexane and the whole is then stirred for 2 hours at about 50°. After cooling, the methylene-bis-3,4-dichloro-aniline is filtered off and washed with cyclohexane. The compound melts at 124–126°.

In the same way, on using corresponding amounts of 3-chloro-4-methyl-aniline, 3-bromo-4-chloroaniline, 3,4-di-bromo-aniline, 3-trifluoromethyl-4-chloroaniline, 3,4-dimethyl-aniline, 3-chloro-4-tert-butylaniline, or 3-fluoro-4-chloroaniline, respectively, Methylene-bis-(3-chloro-4-methylaniline),
Methylene-bis-(3-bromo-4-chloroaniline),
Methylene-bis-(3,4-dibromoaniline),
Methylene-bis-(3-trifluoromethyl-4-chloroaniline),
Methylene-bis-(3,4-dimethylaniline),
Methylene-bis-(3-chloro-4-tert-butylaniline), and
Methylene-bis-(3-fluoro-4-chloroaniline)

are obtained.

*Example 2*

16 parts of 3,4-dichloroaniline and 30 parts of hexamethylenetetramine in 100 parts by volume of water are heated for 24 hours at 90°, whereupon ammonia develops. After cooling, the methylene-bis-3,4-dichloroaniline obtained is filtered off under suction and washed with water. It melts at 124–126°.

*Example 3*

20 parts of methylene-bis-(3,4-dichloroaniline) are dissolved in a mixture of 48 parts of diacetone alcohol, 16 parts of xylene and 16 parts of an anhydrous high molecular condensation product of ethylene oxide and higher fatty acids. This concentrate can be diluted with water to form nematocidal emulsions of any desired concentration.

*Example 4*

80 parts of methylene-bis-(3-chloro-4-methylaniline) are mixed with 2 to 4 parts of a wetting agent, e.g. the sodium salt of an alkyl polyglycol ether monosulfate, 1 to 3 parts of a protective colloid, e.g. sulfite waste liquor, and 15 parts of an inert, solid carrier such as, e.g. kaolin, bentonite, chalk or kieselguhr and the mixture is then finely milled in a suitable mill. The wettable powder obtained is stirred with water and produces a very stable nematocidal suspension.

*Example 5*

5 parts of methylene-bis-(3-trifluoromethyl-4-chloroaniline) are mixed and milled with 95 parts of calcium carbonate (ground limestone). The product can be used as a nematocidal sprinkling agent.

*Example 6*

5 parts of methylene-bis-(3,4-dimethylaniline) are mixed with 95 parts of sand as pulverulent carrier, and the mixture is moistened with 1 to 5 parts by weight of water or isopropanel. The mixture is then granulated. Before granulating the above mixture or one containing more active substance, e.g. one consisting of 10 parts of active substance and 90 parts of calcium carbonate, a multiple amount, e.g. 100 to 900 parts of synthetic fertilizer which may be water-soluble, such a ammonium sulfate, can be mixed in.

*Example 7*

20 parts of methylene-bis-(3,4-dichloroaniline) and 80 parts of talcum are milled in a ball mill to the greatest degree of fineness. The mixture obtained serves as a nematocidal dust.

*Example 8*

A nematocidally active solution which is emulsifiable in water is obtained by mixing 50 parts of an active substance given in the above examples or another active substance of Formula I, 45 parts of xylene, 2.5 parts of an ethylene oxide condensation product of an alkyl phenol (molar ratio 15:1) and 2.5 parts of a mixture of the sodium salts of dodecyloxyethyl sulfuric acid and dodecylethoxyethoxyethoxy sulfuric acid intimately with each other.

*Example 9*

The active substance to be tested is worked up with polyoxyethylene sorbitan monooleate and acetone into an emulsifiable solution, 5 ml. thereof are emulsified with 15 ml. of water and to the emulsion is added 1 liter of soil which is infested with *Meloidogyne arenaria*. After 7 days, the soil is filled into three pots and 10 tomato seedlings are then planted in each pot. After 5 weeks, the nodules (tumors) formed on the roots of the plants are counted and the weight of the plants is determined.

*Average per pot containing 10 plants*

|  | Methylene-bis-3,4-dichloroaniline in mg. per liter earth | | | Controls |
| --- | --- | --- | --- | --- |
|  | 25 | 50 | 100 |  |
| Number of root nodules in percent of controls | 3 | 0 | 0 | 100 |
| Weight of plant in percent of controls | 111 | 121 | 97 | 100 |

I claim:
1. Methylene anilines of the formula

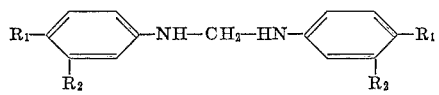

wherein each of $R_1$ and $R_2$, independently, represents a member selected from the group consisting of alkyl with from 1 to 4 carbon atoms, trifluormethyl, chlorine, fluorine and bromine.

2. The compound of the formula

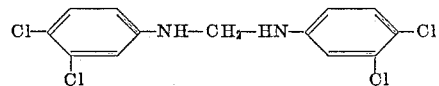

3. The compound of the formula

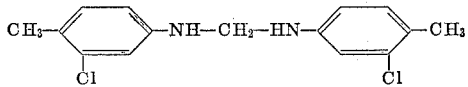

References Cited by the Examiner
UNITED STATES PATENTS
Marxer: "Chemical Abstracts," vol. 49, page 13938 (1955).
Metcalf: "Chemical Abstracts," vol. 43, pages 3137–8 (1949).

CHARLES B. PARKER, *Primary Examiner.*
IRVING MARCUS, *Examiner.*